United States Patent [19]

Sheldrake

[11] Patent Number: 4,491,338
[45] Date of Patent: Jan. 1, 1985

[54] HITCHES

[76] Inventor: Ernest J. Sheldrake, 2 Lowick Close, East Dereham, Norfolk, England

[21] Appl. No.: 367,040

[22] Filed: Apr. 9, 1982

[51] Int. Cl.³ .............................................. B60D 1/14
[52] U.S. Cl. ............................. 280/405 R; 280/476 R; 280/711
[58] Field of Search .......... 280/423 A, 476 R, 405 R, 280/711

[56]  References Cited
U.S. PATENT DOCUMENTS

| | | | |
|---|---|---|---|
| 2,325,822 | 8/1943 | Whitmer | 280/476 R |
| 3,044,762 | 7/1962 | Strengelin | 280/711 |
| 3,980,316 | 9/1976 | Yates | 280/711 |
| 4,162,082 | 7/1979 | Curry | 280/423 A |
| 4,220,352 | 9/1980 | Umeda et al. | 280/476 R |

Primary Examiner—Joseph F. Peters, Jr.
Assistant Examiner—D. Lynn Fugate
Attorney, Agent, or Firm—Lee, Smith & Zickert

[57] ABSTRACT

A hitch (10) for attaching an item of equipment to be towed, e.g. a caravan or trailer, to a towing vehicle, such as a car, comprises a framework (12) carried by at least one road wheel or roller (30) located between the rear of the car and the forward end of the caravan. A towbar (40) is connected to the framework (12) for attachment to the caravan, e.g. via a ball and socket connection for detachably joining the framework (12) to the rear of the car. Use of the hitch (10) means that the forward weight of the caravan is not supported on the rear of the car as with a conventional ball and socket hitch, but by the intermediate framework (12) and road wheel(s) attached to the rear of the car, improving road handling and allowing a greater load to be towed. Ease of hitching and unhitching is also greatly improved. The wheels are attached to the framework of the hitch by telescoping supports containing airsprings. These are formed by one or more airbags (24) containing pressurized air. The framework is conveniently formed from hollow tubing to reduce weight.

10 Claims, 7 Drawing Figures

4,491,338

HITCHES

DESCRIPTION

1. Field of Invention

This invention concerns a hitch for attaching an item of equipment to be towed, such as a caravan or trailer, to a towing vehicle, such as a car.

2. Background to the Invention

A ball and socket hitch for caravans and trailers is already known and has been used for many years. In the known device, the ball is carried by a mounting plate attached to the rear of the towing vehicle and the socket is rotatably mounted at the end of a towing arm extending forwardly from the caravan or trailer. The socket is formed with a catch by which it can be secured in place over the ball so that there is little tendency for the socket to jump off the ball whilst a vehicle is being towed. On the other hand, the ball does permit freedom of movement between the towing vehicle and the towed vehicle and it has always been assumed that the high degree of relative movement made possible by a ball and socket joint is a prerequisite of a satisfactory towing connection between a vehicle such as a car and a caravan.

On the other hand, experience has shown that, particularly at high speeds, a ball and socket joint does not form a stable connection between a car and a caravan for example. Considerable swaying of a caravan from side to side can be experienced whilst travelling at speeds and once a periodic swinging of a caravan from side to side has been set up, it is sometimes very difficult to damp this down simply by slowing the vehicle down.

It is therefore an object of the present invention to provide an improved hitch for attaching, for example, a caravan or trailer to a towing vehicle such as a motor car.

THE INVENTION

According to the present invention a hitch for attaching an item of equipment to be towed to a towing vehicle comprises a framework carried by at least one road wheel or roller for locating between the rear of the towing vehicle and the forward end of the item to be towed, a tow-bar or coupling member for attachment to the item to be towed, and connecting means for detachably joining the hitch to the rear of the towing vehicle.

In preferred embodiments a single pair of road wheels is provided on the framework. In this case, the wheels of the pair are preferably arranged for independent rotation, eg by being mounted on separate axles, to improve handling characteristics of the hitch, particularly when cornering.

Further, the wheels of the pair are preferably arranged for movement with respect to respective independent vertical axes, again to facilitate handling characteristics and to eliminate 'scuffing' of the tyres on cornering and so improve tyre life. This is conveniently achieved by mounting each wheel to one end of a respective pair of trailing arms, the other end of which is mounted for pivoting about a vertical axis, eg by use of a ball race bearing.

The wheel or wheels or the like are preferably resiliently mounted relative to the tow-bar or coupling member and connecting means so as to provide a degree of springing between the road wheels and the towing vehicle and item to be towed and so improve the ride. For example, one or more torque springs may be incorporated in the trailing arm mounting of the embodiment described above. Additionally, if desired, one or more airbags may be suitably incorporated in the hitch.

In preferred embodiments, the wheel(s) or roller(s) is/are resiliently mounted to the framework by pneumatic suspension means.

The pneumatic suspension means conveniently comprises a housing, possibly in the form of a piston and cylinder arrangement, with one or more airbags located therein. Suitable air inlet and outlet means are provided to enable the pressure of air in the bag to be adjusted to a suitable value to give an appropriate degree of resilience dependent on the towing vehicle, the item to be towed and the nature of the terrain it is intended to cover.

A particularly suitable type of airbag for this purpose is a 4½" (115 mm) convolute bellow airspring assembly, manufactured by Dunlop.

In one embodiment a single pair of road wheels is provided on the framework, each wheel having associated therewith a respective housing, eg piston and cylinder, arrangement as discussed above.

The two airbags may be completely independent of one another, enabling individual regulation of the air pressure thereof. Alternatively, the two inlets may lead to a common inlet by use of a suitable T piece, enabling simultaneous inflation of the two bags. The second alternative is, however, less preferred at present because of the additional weight and cost of the additional components involved.

When only a single 4½" (115 mm) convolute bellow airspring assembly is employed per housing, eg piston and cylinder, arrangement as described above, the arrangement does not permit sufficient movement of the wheel(s) or roller(s) relative to the framework to prevent 'bottoming' in all circumstances. It is accordingly preferable in such cases to use two or more airbags in series in such a housing arrangement.

By using two or more suitable airbags appropriately inflated, a hitch can be provided which will permit an appropriately large range of relative movement between the wheel(s) or roller(s) and the framework to prevent 'bottoming' even during use on very rough terrain.

For example, by using two 4½" (115 mm) convolute bellow airspring assemblies, as mentioned above, relative movement of 7" (180 mm) is allowed, which is adequate for most conditions.

The housing for the airbag or bags may comprise a piston and cylinder assembly. Each piston and cylinder assembly may comprise an outer tubular housing within which is slidably located an inner cylindrical member, these components being dimensioned to leave a small gap therebetween of, eg 0.15" (0.3 mm), just sufficient to permit lubrication. It is clear that with such an arrangement, the inside diameter of the outer housing and the outside diameter of the inner member must be accurately produced to a high tolerance, placing certain constraints on manufacturing techniques. For instance, the outer housing is conveniently formed from plate and welding. However, the outer housing cannot be produced by this method with an inside diameter formed to a sufficiently high tolerance to give a good fit between the components.

An alternative approach which has therefore been developed to overcome this problem is to leave a rather larger gap, eg ¼" (6 mm) between the components, with the inner member being formed rather smaller but with an accurately produced outside diameter, eg 4¾" (120 mm), and with the outer housing having a rather less accurately produced inside diameter (eg nominal 5" (126 mm).

The gap between the components is sealed using suitable sealing rings such as common sealing rings lubricated by water, eg Tufnol rings, machined to suit the outer housing inside diameter. Lubrication of the preferred Tufnol rings involves watering once a month. It is to be noted in this connection that a rolling process allows accurate control of the outside diameter of a component, but not of the inside diameter.

A further, preferred alternative is to employ a cage-like housing for the airbag or bags in place of the cylinder. This alternative is cheaper and simpler to manufacture and results in a significantly lighter hitch.

According to a particularly preferred embodiment, a hitch for attaching an item of equipment to be towed to a towing vehicle comprises a framework carried by a pair of road wheels or rollers for locating between the rear of the towing vehicle and the forward end of the item to be towed, a towbar or coupling member for attachment to the item to be towed, connecting means for detachably joining the hitch to the rear of the towing vehicle, the towbar and connecting means being pivotally connected to the framework via pneumatic suspension means with the pivotal connection being arranged to permit pivoting movement about a horizontal axis extending in a generally fore and aft direction.

The pivotal movement thus permitted by this arrangement has the effect of providing independent suspension for the wheels or rollers, thus greatly enhancing handling characteristics.

The pneumatic suspension means conveniently comprises a housing containing one or more airbags such as the Dunlop 4½" (115 mm) convolute bellow airspring assemblies described above. The housing conveniently carries the towbar and connecting means and is pivotally connected to the framework at a point generally midway along the length of the framework.

The framework conveniently comprises a cranked beam having outer horizontal portions and a central, lower horizontal portion interconnected by inclined portions, with the pneumatic suspension means connected to the central, lower horizontal portion. This arrangement results in a more compact hitch assembly.

The towbar or coupling member is conveniently adapted for connection to a conventional towing frame such as is generally provided at the front end of, say, caravans and trailers. Thus, for example, the towbar or coupling member of the hitch may be provided with a towing ball of conventional construction for attachment to a conventional towing socket on the towing frame. Alternatively, a so-called 'fifth wheel' attachment such as is commonly utilised on articulated vehicles may be provided on the towbar, for attachment to a complementary member on, for example, a caravan towing frame.

The means for joining the hitch to the rear of a towing vehicle conveniently comprises an attachment member adapted to be rigidly secured, eg bolted, to one or more mounting plates fixed to the rear of the towing vehicle and also to be rigidly secured to the hitch preferably in such a manner that the hitch can be quickly and easily detached from the attachment member and hence from the towing vehicle.

A primary advantage of the invention is that the forward weight of the towed item, eg trailer or caravan, is not now supported on the rear of the towing vehicle as in the conventional ball and socket hitch but through the intermediate framework and road wheel(s) attached to the rear of the towing vehicle. By transferring the weight in this way, much of the loading on the towing vehicle is removed which greatly improves the road handling of the towing vehicle and allows a greater load to be towed by the vehicle than would otherwise be the case.

A further advantage of the invention lies in the ease with which a towing vehicle can be hitched and unhitched to, eg a caravan or trailer. Where a simple conventional ball and socket joint is employed, the full forward weight of the towed vehicle has to be borne by the operator as he lifts the socket at the end of the towing arm onto or off the ball. In contrast with the present invention because the forward weight of the towed item is supported by hitch, there is no need to lift this weight during hitching and unhitching.

Preferred embodiments of the invention will now be described, by way of example, with reference to the accompanying drawings.

In the drawings

DETAILED DESCRIPTION OF DRAWINGS

Figure 1:
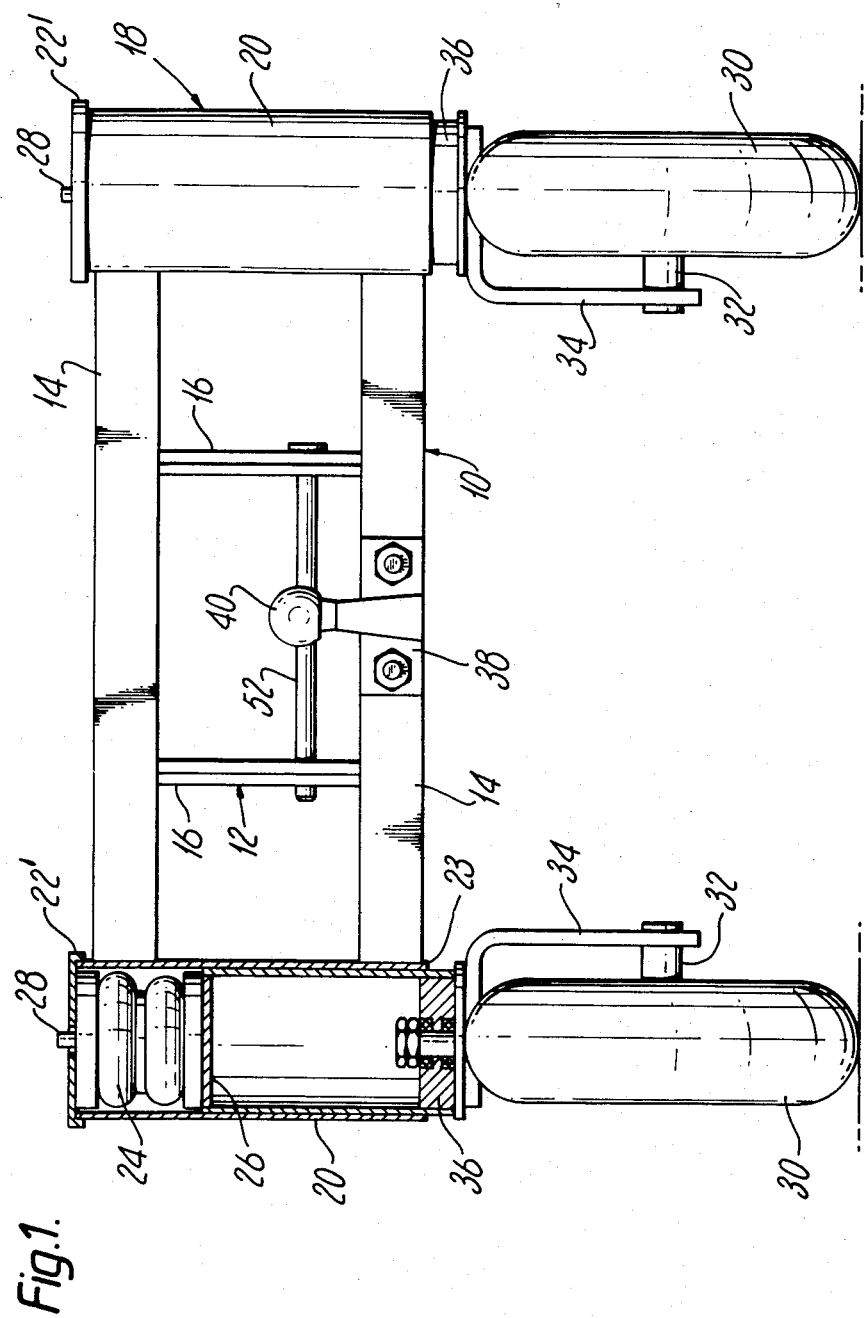
FIG. 1 is a rear view of one embodiment of a hitch in accordance with the present invention.
Figure 2:
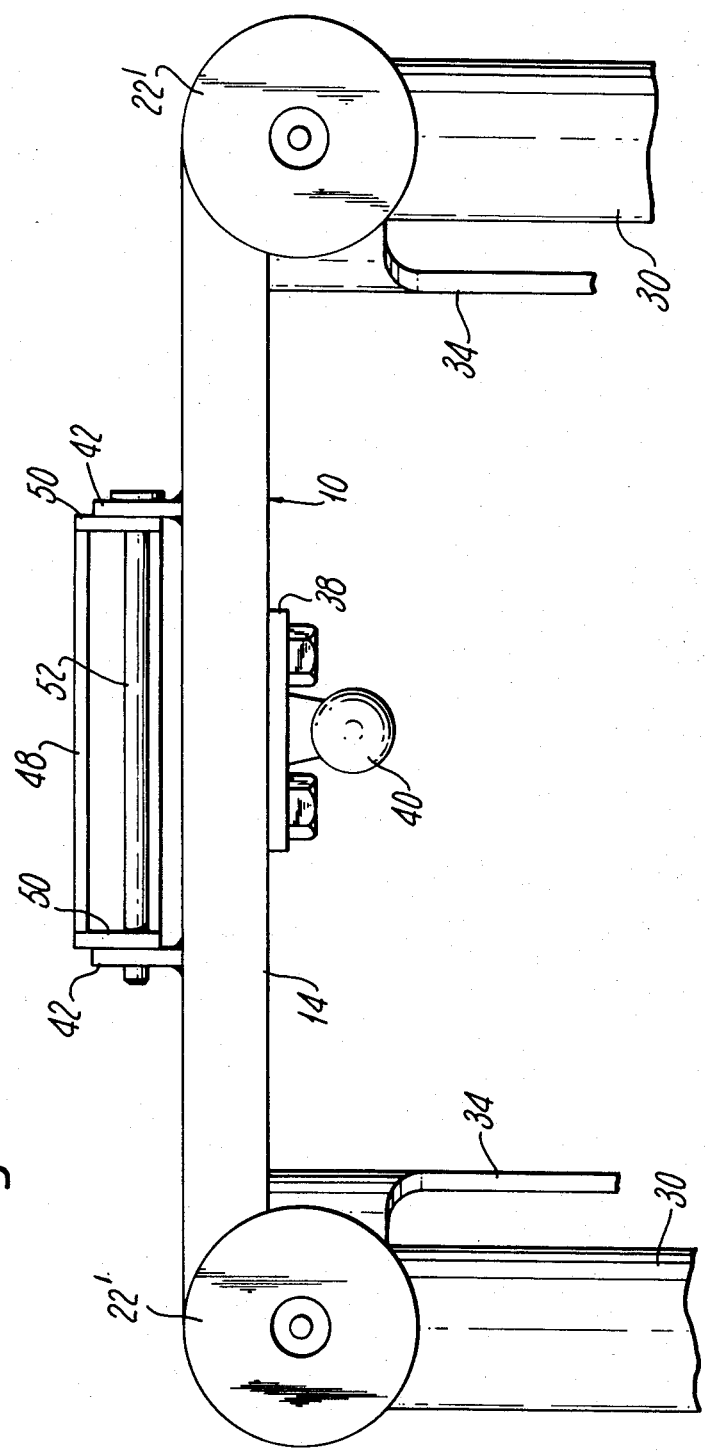
FIG. 2 is a top plan view of part of the hitch illustrated in FIG. 1.
Figure 3:
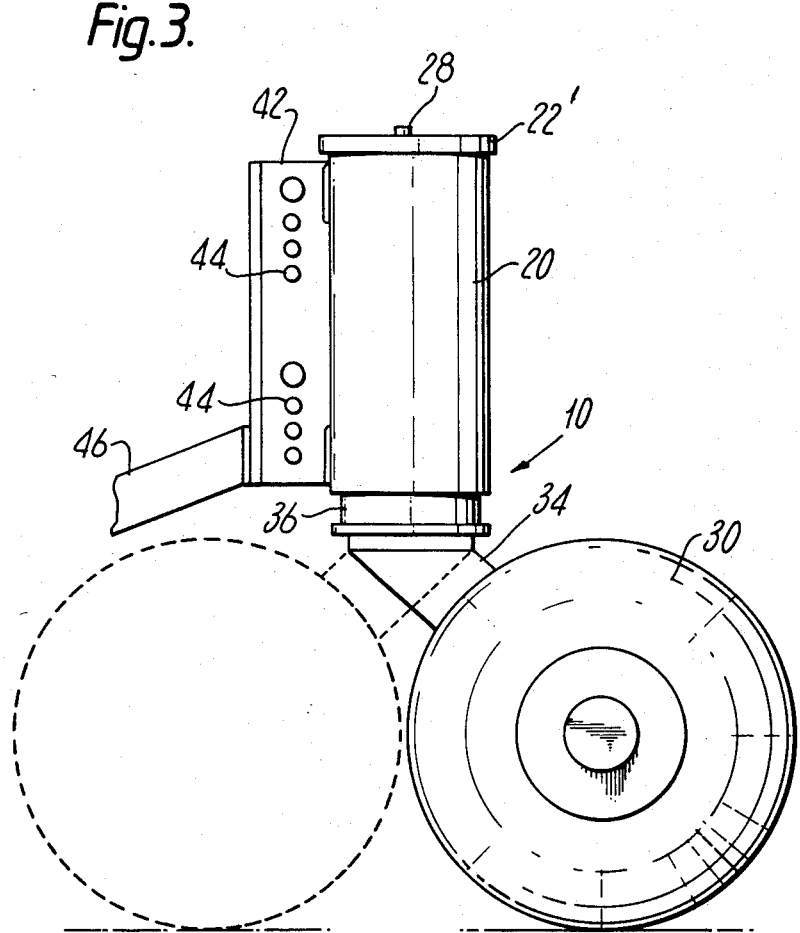
FIG. 3 is a side view of the hitch illustrated in FIGS. 1 and 2.

Referring to the drawings, FIGS. 1, 2 and 3 illustrate a two-wheeled hitch 10 for attaching an item of equipment to be towed to a towing vehicle. The hitch 10 comprises a framework 12 in the form of two square-section transverse members 14 interconnected by two vertically extending mounting plates 16, to be discussed below.

A respective wheel suspension assembly 18 is secured to each end of the framework 12, for example by welding. Each assembly 18 comprises an outer tubular housing 20 within which is slidably located an inner cylindrical member 22 to form a piston and cylinder assembly. There is a small gap between the sidewalls of the housing 20 and member 22, just sufficient to permit lubrication, eg 0.015" (0.3 mm), and a suitable grease and dust sealing arrangement 23 is provided at the base of the housing 20.

The upper end of each tubular housing 20 is closed by means of an end cap 22', and an airbag 24 (shown in compressed condition) is located within the tubular housing 20, between the end cap 22 and an upper end wall 26 of the inner cylindrical member 22. The airbag 24 used in this embodiment is a 4½" (115 mm) convolute bellow airspring assembly, manufactured by Dunlop. The airbag 24 is secured to the end cap 22' by means of three countersunk screws (not shown) and is secured to the end wall 26 in a similar manner.

A valved inlet/outlet connection extends from the top of each airbag 24 through the associated end cap 22', and terminates in a respective connector 28 to permit inflation and deflation of the airbags. If necessary, an appropriate adaptor (not shown) may be secured to the connector 28 to permit use of suitable pump means, eg a conventional foot pump.

The airbags are for the purpose of providing for shock absorption and suspension, as will be described below.

A respective wheel 30 having a stub-axle 32 is mounted to one end of an associated trailing arm 34, the other end of which is secured to the base of one of the cylindrical members 22 via a ball-race bearing 36. This wheel mounting arrangement thus permits rotation of the wheels through 360° about a vertical axis.

In use, in normal forwards running, the wheels will be located to the rear of the framework, as illustrated in full lines in FIG. 3. However, on reversing the wheels will swivel around to the position shown in dashed lines in that Figure.

In the illustrated embodiment the wheels are 12" (310 mm) or 13" (330 mm) in diameter.

Although not illustrated, it is possible to mount a disc brake attachment on the stub-axle 32 of each wheel, inboard of the arm 34.

A towbar or coupling member 38 is bolted to the rear face of the lower transverse member 14 and is provided at its free end with a conventional towing ball 40 to permit attachment of the hitch 10 to the caravan or the like by use of a conventional towing socket provided on a towing frame extending from the front end of the caravan.

As shown in FIGS. 2 and 3, the mounting plates 16 extend forwardly beyond the transverse members 14 to form two rectangular protrusions 42. These protrusions 42 each includes two sets of four apertures 44 and are for the purpose of attaching the hitch 10 to the rear of the towing vehicle. To this end the towing vehicle has a towing bracket 46 rigidly secured to the rear thereof, and the towing bracket 46 is connected to a transverse member 48 with two apertured rectangular sideplates 50. The dimensions of the member 48 and plates 50 are such that they will just fit within the protrusions 42 of the hitch so that the hitch 10 can be fixed to the car by aligning the apertures in the protrusions 42 and plates 50, as shown in FIG. 3, and passing two connecting pins 52 through the aligned apertures. This is illustrated in FIGS. 1 and 2, although only one pin, the lower pin, is shown in FIG. 1. The pins 52 are then secured in position by passing over centre spring cleat pins (not shown) through apertures in the protruding ends of the pins. The presence of four holes in each set in the protrusions 42 enables adjustment of the height of the hitch 10 relative to the rear of the towing vehicle, up to a maximum of 200 mm.

In use of the hitch, it is secured to the rear of a towing vehicle as described above, and each bag 24 is inflated to a suitable pressure by attaching a suitable pump, eg a foot pump, to connector 28, via an adaptor if necessary. The pressure will be selected depending on the towing vehicle, the item of equipment to be towed and the nature of terrain to be covered. With the particular airbags used in the illustrated embodiment, the air pressure will generally be in the range 5–80 psi (0.35–5.62 kg per cm$^2$), enabling carrying of a load of up to one and a half tons (1.52 tonnes). A typical value will be 15 psi (1.05 kg per cm$^2$).

With the caravan or other item of equipment attached to the hitch 10 via towing ball 40, the hitch 10 functions in use to support the forward weight of the towed item. This improves the road-handling of the towing vehicle, eliminating 'wagging' of the rear end, and allows a greater load to be towed by the vehicle than would otherwise be the case. Further, the airbags 24 and piston and cylinder arrangements provide pneumatic suspension and shock absorption of the wheels 30 relative to the framework 12, again improving handling.

The above embodiment may be modified in various ways. For instance, a smaller, narrower version with smaller wheels is envisaged for certain applications.

Figure 4:
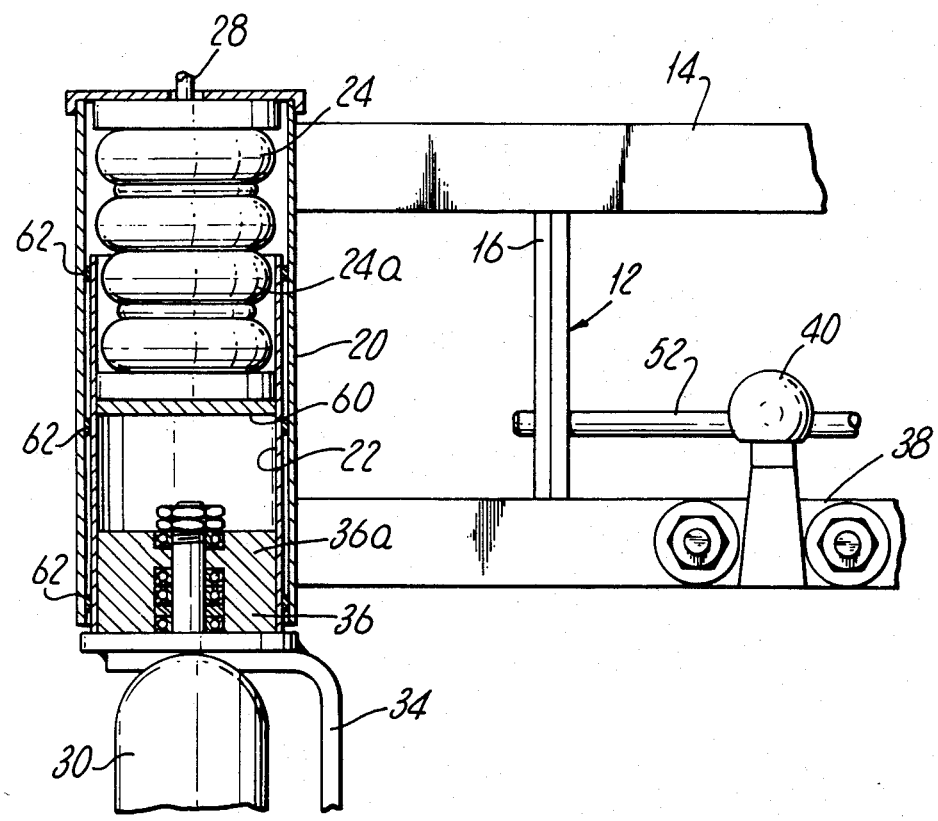
FIG. 4 is a part section rear view of part of another hitch embodying the present invention.

FIG. 4 illustrates a hitch which is generally similar to the hitch 10 illustrated in FIGS. 1, 2 and 3, and like components have been designated by like reference numerals.

The points of difference between the two hitches are as follows:

In the present embodiment two airbags 24 and 24a, connected to another in series, are located between the tubular housing 20 and inner cylindrical member 22. The upper end of airbag 24 is secured to the housing end cap as before, but the lower end of the airbag 24a is secured to a platform 60 within the inner member 22. It is to be noted that the two airbags are illustrated in compressed condition.

The airbags used in this embodiment are both 4½" (115 mm) convolute bellow airspring assemblies, manufactured by Dunlop. Each is capable of 3½" (90 mm) movement, giving a total of 7" (180 mm) permitted movement.

Further, two ball race bearings 36 and 36a are provided in the present embodiment as these are found necessary to give sufficient strength and rigidity.

As shown, a larger gap is provided between the outer housing 20 and inner member 22. The inner member 22 is produced by a rolling process with an accurately produced outside diameter of 4¾" (120 mm). The outer housing 20 has an inside diameter produced to less close tolerances, being nominally 5" (126 mm). The gap between these components is sealed by three Tufnol rings 62 machined to suit the outer housing inside diameter. As mentioned above, lubrication involves watering once a month.

Although not shown, the transverse members 14 are preferably in the form of respective oval section tubes. Each tube extends across the framework 12 as before, but at its end is curved around the front of housings 20 and secured thereto.

Finally, the trailing arms 34 are preferably also formed of tube to reduce weight and cost.

Figure 5:
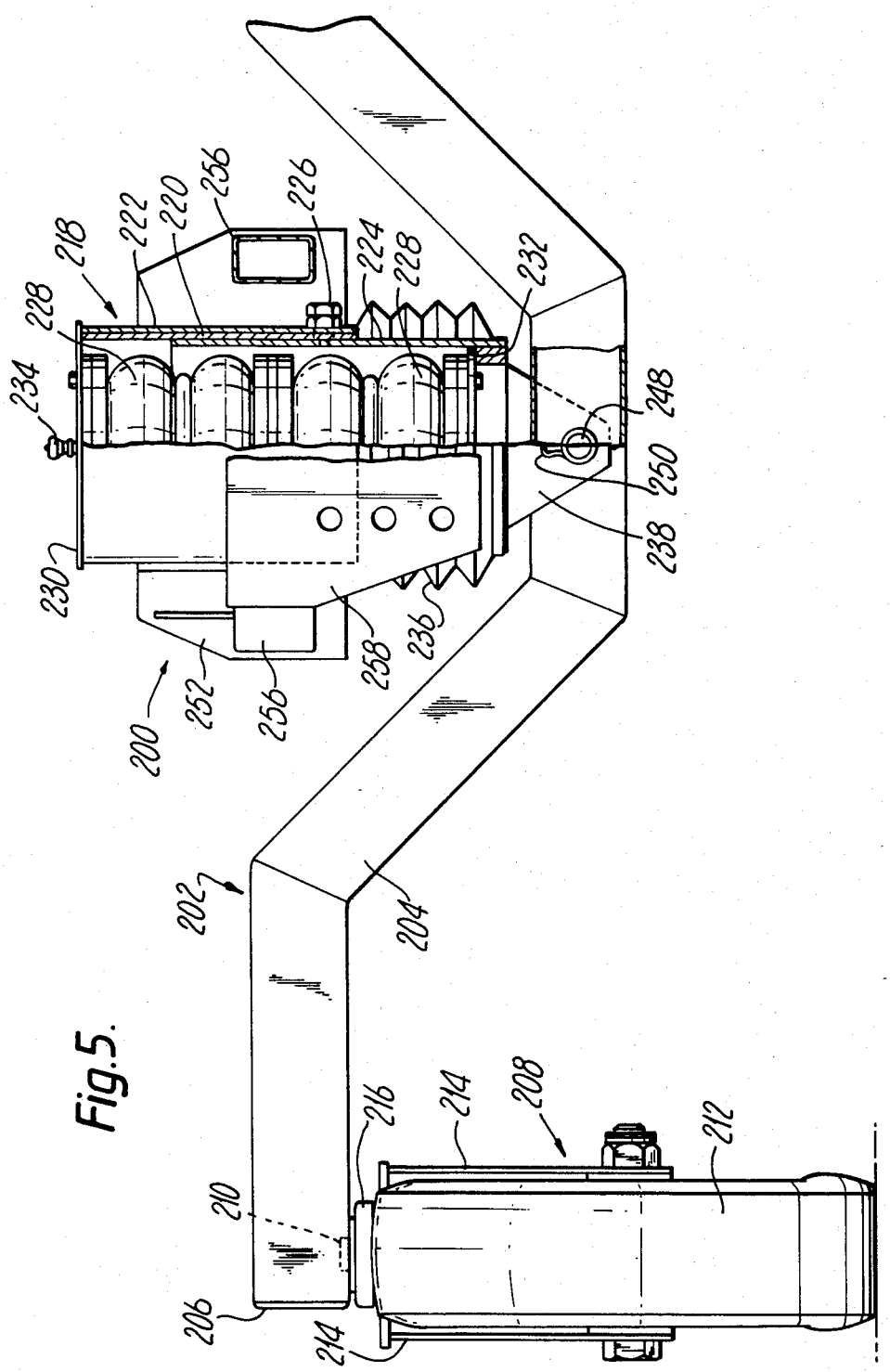
FIG. 5 is a rear view of part of a further hitch in accordance with the present invention.
Figure 6:
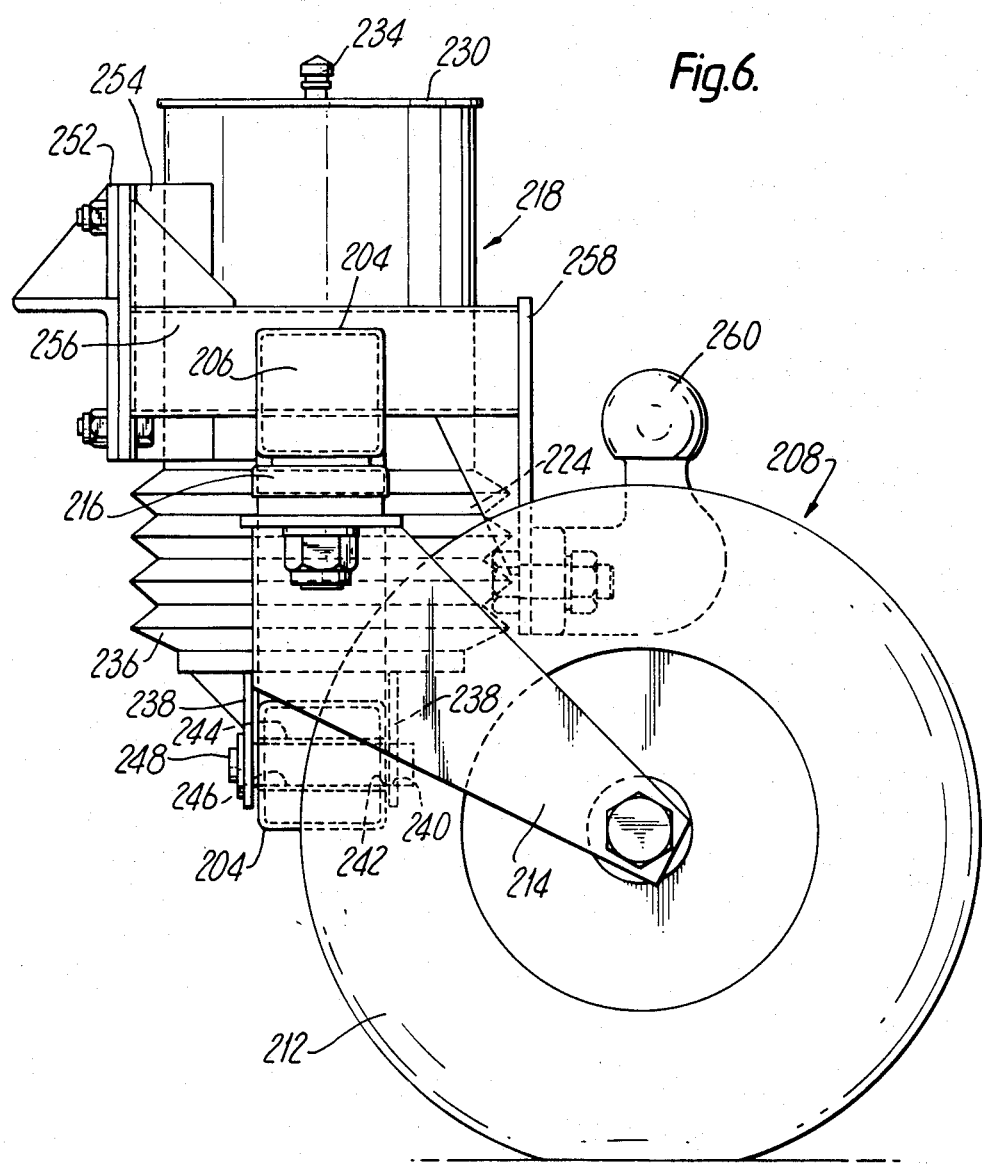
FIG. 6 is a side view of the hitch illustrated in FIG. 5, shown to a enlarged scale.

FIGS. 5 and 6 illustrate a further hitch 200 comprising a framework 202 in the form of a square section transverse member 204 which is of hollow configuration. The free ends thereof are closed off by means of plastics end plugs 206.

The member 204 is of cranked configuration, having outer horizontal portions and a central lower horizontal portion interconnected by means of inclined portions. A member of such configuration is conveniently produced from a straight length of appropriate tubular material which is cut, bent and welded at appropriate locations.

A respective wheel assembly 208 is pivotally mounted at each end of member 204 via pivot post 210 for pivoting movement about a vertical axis.

As shown best in FIG. 6, each wheel assembly 208 comprises a wheel 212 approximately 12¾" (324 mm) in diameter having a pneumatic tire. The wheel 212 is mounted on a pair of trailing arms 214 secured to the member 204 via a castor bearing assembly 216 which provides for self-tracking of the wheel assembly.

Pneumatic suspension means 218 are pivotally mounted to the central lower horizontal portion of transverse member 204. The suspension means comprise a piston and cylinder arrangement consisting of an upper, outer cylinder 220 (having a sleeve 222 of synthetic resin bonded to the outer surface thereof) within which is received a lower, inner cylinder 224 in telescopic sliding relationship.

In order to prevent relative rotation between the cylinders and limit relative axial movement thereof, a stop stud 226 secured with respect to the outer cylinder extends into a closed ended slot (not shown) running along the length of the inner cylinder.

A pair of 4½" (115 mm) convolute bellow airspring assemblies 228 (manufactured by Dunlop) are housed within the cylinders 220, 224, with the airspring assemblies arranged in series. The upper assembly 228 is secured to an end cap 230 which closes off the upper end of cylinder 220, and the lower end of the lower assembly 228 is secured to a lower end plate 232 within lower cylinder 224.

A valved inlet/outlet 234 is provided on the end cap 230 to permit inflation and deflation of the assemblies 228.

A gaiter 236 covers the exposed portion of lower cylinder 224 protruding from below the upper cylinder 220.

A pair of fixing plates 238 extend downwardly from the lower cylinder end plate 232, with one plate located forwardly and one to the rear of opposed faces of member 204, as best shown in FIG. 6. These two plates include respective circular apertures 240 and the adjacent faces of member 204 include similar circular apertures 242 which together permit the pivotal connection of the suspension means with respect to the member 204. To this end, a mild steel tubular insert 244 is secured within member 204, extending between the apertures, for receiving a nylon bush 246. A stainless steel pivot pin 248 extends through the bush and apertures 240 in the fixing plates and is held in position by means of spring arrangement 250. This arrangement thus permits pivoting of the suspension means relative to the framework about a horizontal axis extending in a generally fore and aft direction, providing for independent suspension of the two wheel assemblies 208.

A connector plate 252 is secured to the front of upper cylinder 220 by means of arms 254 to enable attachment of the hitch to an appropriate mounting arrangement secured to the rear of a towing vehicle (not shown).

A pair of angle tubular arms 256 of rectangular cross-section extend rearwardly from plate 254 to a further plate 258 to which is secured a standard towball coupling 260 to permit attachment to the hitch of an item of equipment to be towed (not shown) such as a caravan or trailer.

In use, the suspension means is attached to the rear of a towing vehicle at an appropriate height via plate 252 and the framework and wheel assemblies can then be attached thereto. An item of equipment to be towed can then be attached to the hitch by use of towball 260.

The height of the plate 252 and pressure of air in the bellows assemblies 228 are adjusted such that normal ride height of the top of the piston when the hitch is coupled and loaded is approximately 520 mm (20½")
above ground level. It is is to noted that in FIGS. 5 and 6 the piston and cylinder assembly is illustrated in semi-collapsed condition, and that the distance between the pivot joint and top of the assembly when in fully extended condition is 406 mm, and when in fully collapsed condition is 256 mm.

Further, the framework and wheel assemblies can be detached from the suspension unit and stowed in the towing vehicle when not required for towing, without any requirement to remove the piston and cylinder assembly.

Figure 7:
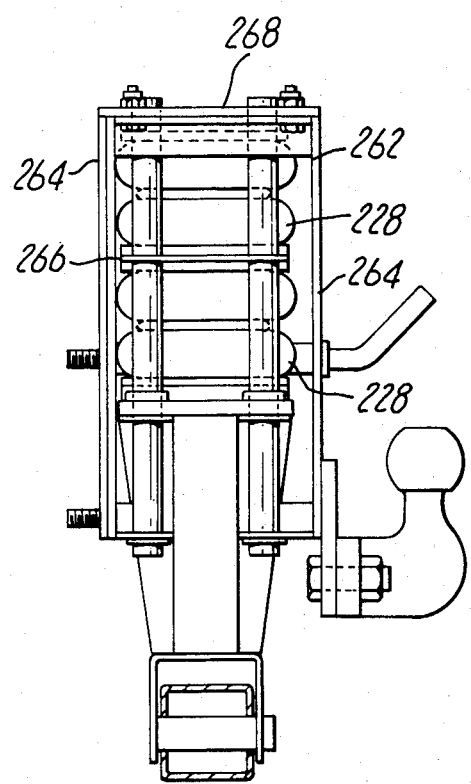
FIG. 7 is a side view illustrating a modified embodiment of hitch.

FIG. 7 illustrates a modification to the embodiment of FIGS. 5 and 6 in which the cylinders 220 and 224 are replaced by a cage-like housing 262, comprising front and rear plates 264 between which bellows assemblies 228 are housed. The assemblies 228 are linked by a centreplate 266, with the upper end of upper assembly 228 being secured to a top plate 268. The assemblies 228 are arranged for axial movement within the housing 262 in exactly the same manner as when housed in cylinders, and the modified hitch functions in exactly the same manner as the previously described embodiment.

By using a cage-like housing 262 in place of the cylinders 220 and 224, manufacture is considerably simplified and costs reduced significantly. Further, the resulting assembly is significantly lighter in weight.

I claim:

1. A hitch for attaching an item of equipment to be towed to a towing vehicle, comprising a framework carried by at least one road wheel or roller for locating between the rear of the towing vehicle and the forward end of the item to be towed, a coupling member secured with respect to said framework for attachment to the item to be towed, connecting means for detachably and securely joining the framework to the rear of the towing vehicle, said connecting means including an attachment member and means for changing the height of said attachment member relative to the height of said framework, pneumatic suspension means rigidly secured to the rear of the towing vehicle to provide resilient mounting of the wheel(s) or roller(s), and means to vary the resilience of said suspension means.

2. A hitch according to claim 1 in which a single pair of road wheels is provided on the framework.

3. A hitch according to claim 2 in which the wheels of the pair are arranged for independent movement with respect to respective independent vertical axes.

4. A hitch according to claim 1 in which the attachment member is adapted to be secured to one or more mounting plates fixed to the rear of the towing vehicle and also to be rigidly secured to the framework in such a manner that the framework can be quickly and easily detached from the attachment member and hence from the towing vehicle.

5. A hitch according to claim 1 in which the pneumatic suspension means comprises a piston and cylinder arrangement with at least one airbag located therebetween.

6. A hitch according to claim 1 in which the pneumatic suspension means comprises an open housing within which at least one airbag is located.

7. A hitch according to claim 5 or 6 in which the airbag is a convolute bellow airspring assembly.

8. A hitch according to claim 1 in which the coupling member and connecting means are pivotally connected to the framework via the pneumatic suspension means, with the pivotal connection being arranged to permit pivoting movement about a horizontal axis extending in a generally fore and aft direction.

9. A hitch according to claim 8 in which the pneumatic suspension means comprises a housing carrying the coupling member and connecting means, the housing being pivotally connected to the framework at a point generally midway along the length of the framework.

10. A hitch according to claim 8 or 9 in which the framework comprises a cranked beam having outer horizontal portions and a central lower horizontal portion interconnected by inclined portions, with the pneumatic suspension means connected to the central lower horizontal portion.

* * * * *